United States Patent Office 3,301,340
Patented Jan. 31, 1967

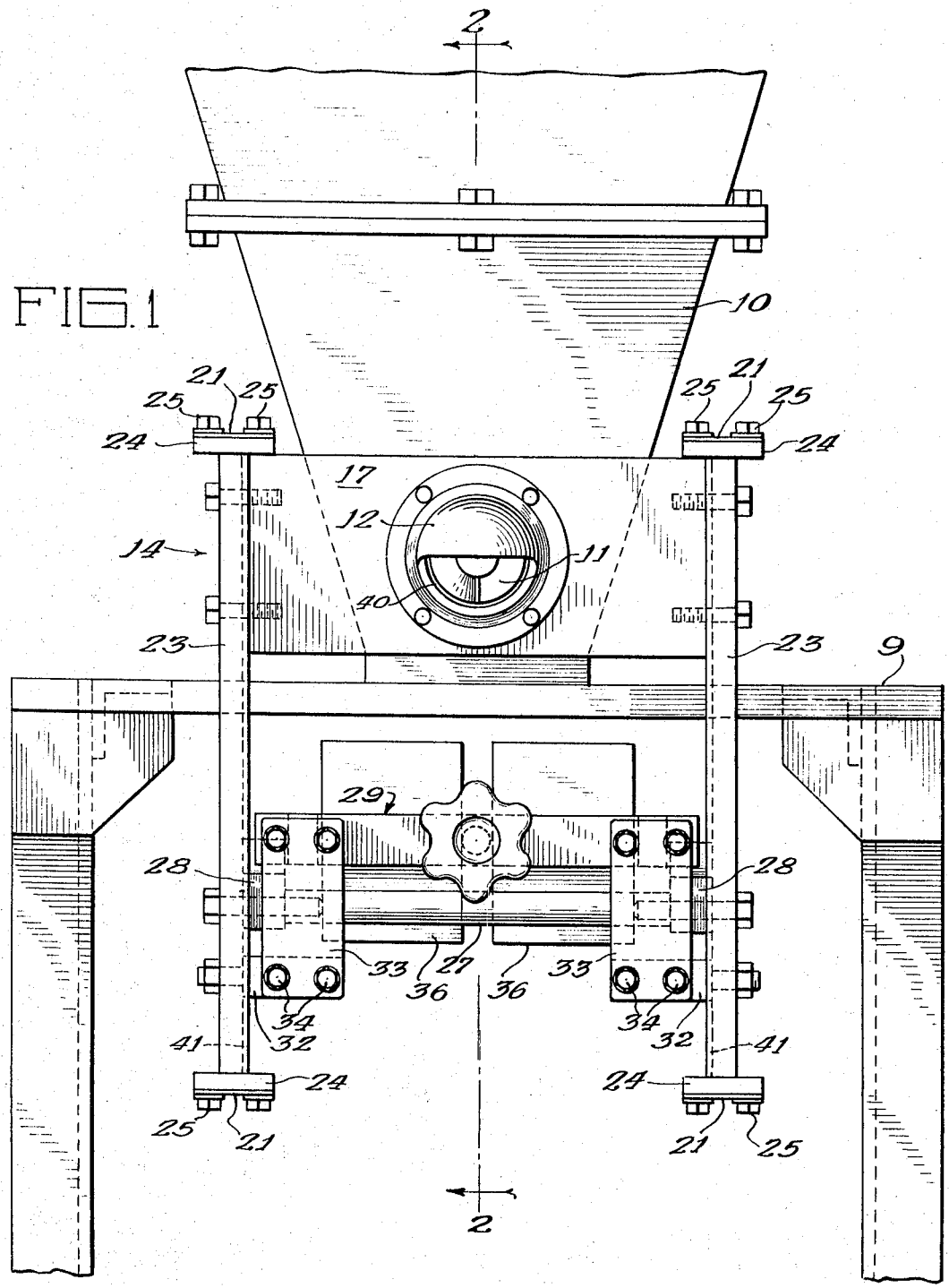

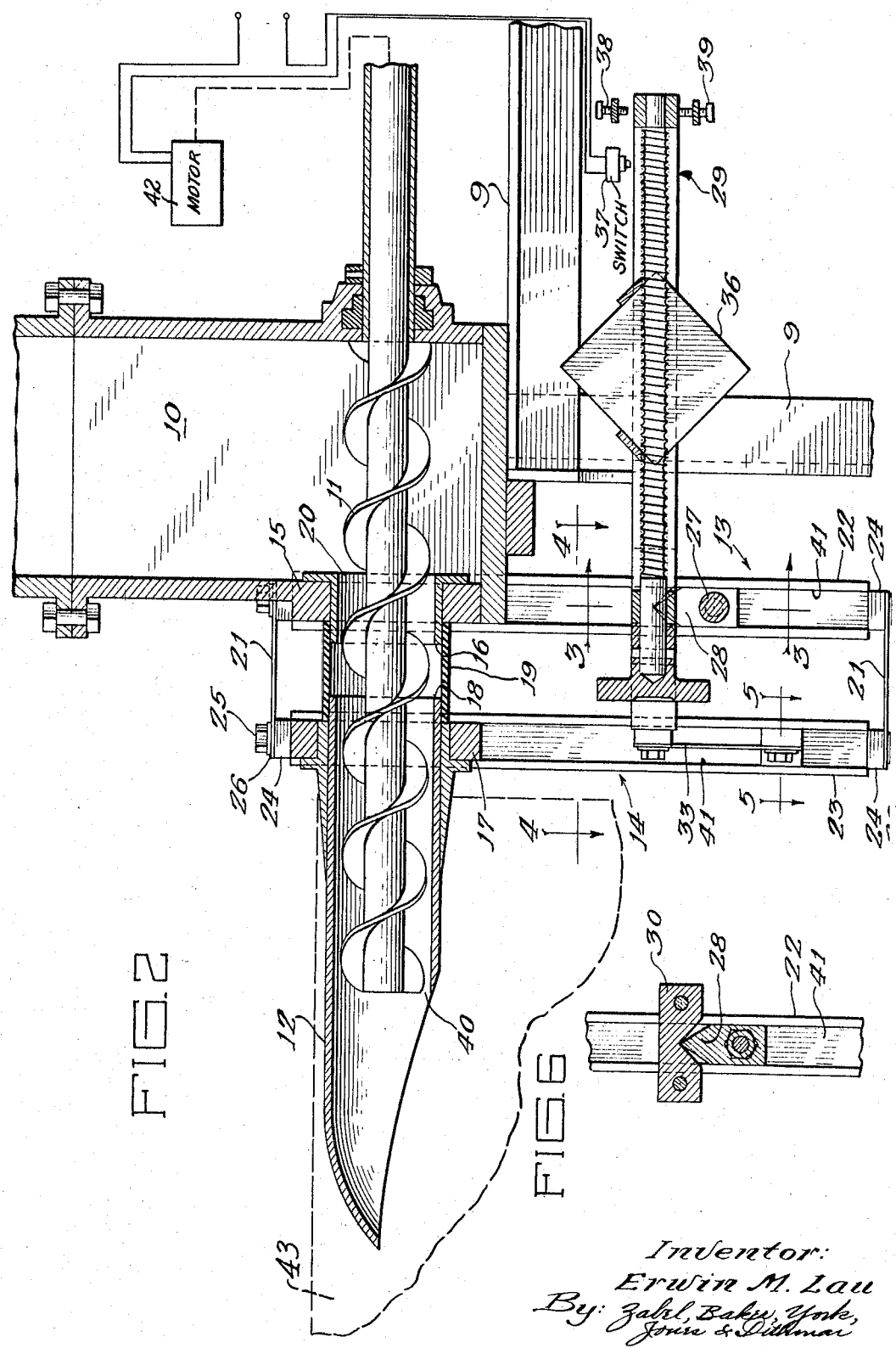

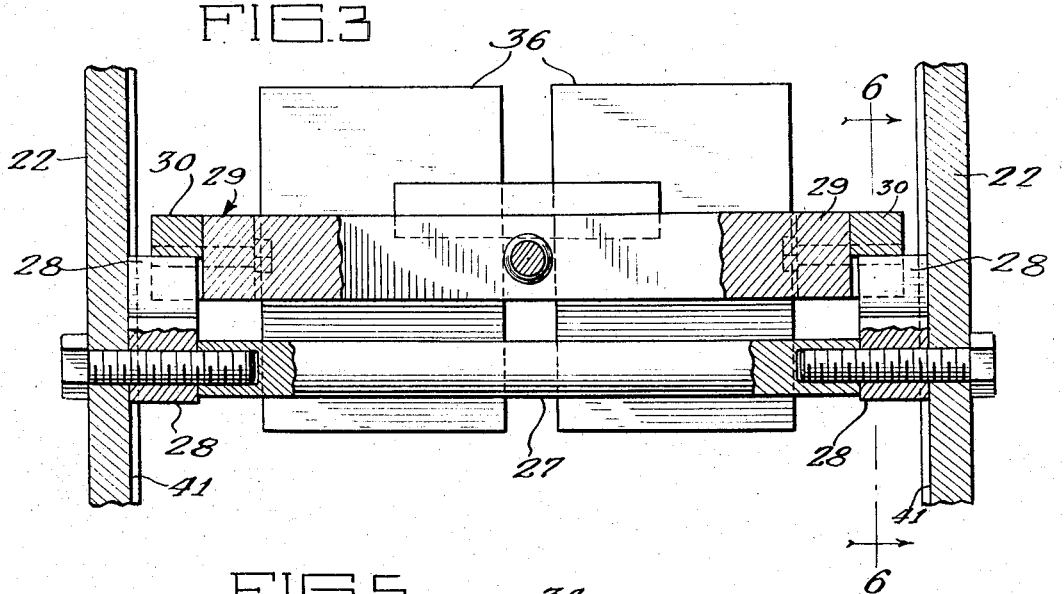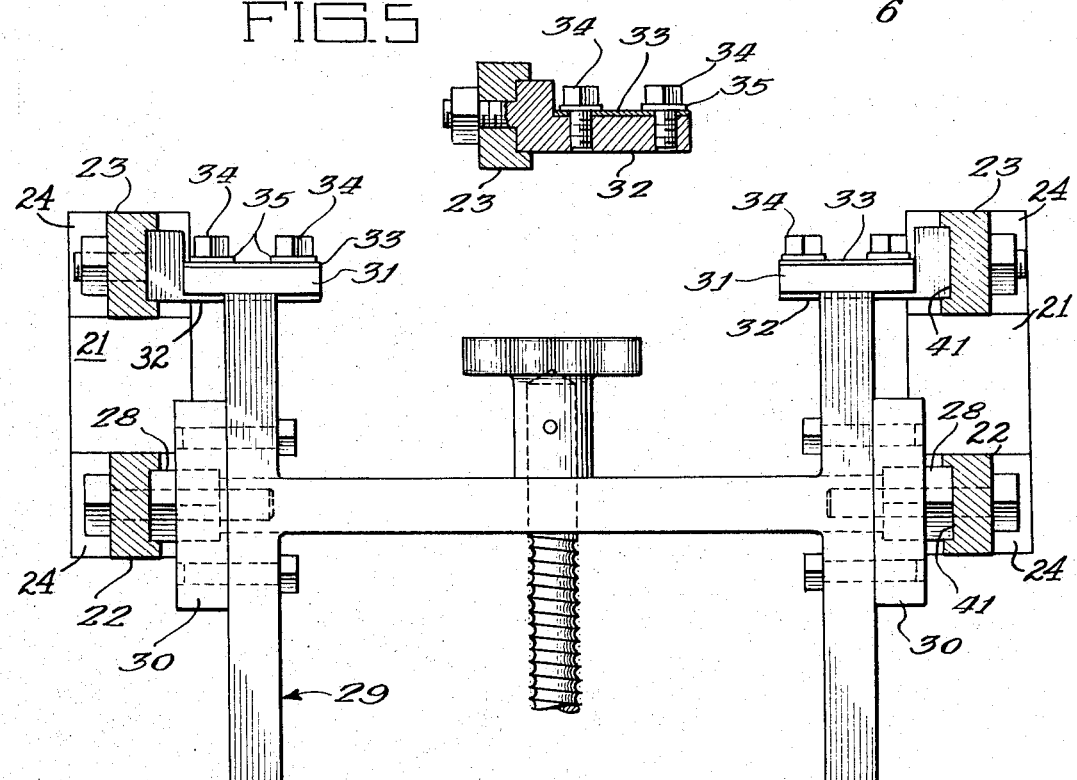

3,301,340
TORQUE RESISTANT MOUNTING FOR FLOATING FRAME OF BAG FILLING MACHINE
Erwin M. Lau, Dolton, Ill., assignor to Black Products Co., Chicago, Ill., a corporation of Illinois
Filed Sept. 23, 1964, Ser. No. 398,564
5 Claims. (Cl. 177—60)

The present invention relates to bag filling machines and is an improvement of the device shown in my prior Patent No. 2,733,040, granted January 31, 1956.

The object of my invention is to provide a torque resistant mounting for the floating frame of a bag filling machine which is particularly adapted for use with a knife edge mounted scale beam and weighing mechanism.

My prior patent shows an auger machine having a double spout construction. If the inner spout is removed, the torque of the auger is transmitted to the spout and the floating frame. This will cause inaccuracies in weighing because the spacer points of my earlier construction are not adapted to resist torque.

Since the throw of the beam is very small, any transient movements imparted to the floating frame will cause premature tripping. Therefore, it is important to provide a mounting means for the floating frame which is resistant to auger torque.

According to the present invention I mount the floating frame by four leaf springs which are located at each one of the four corners of the floating frame. I have found that this arrangement effectively resists the torque transmitted by the auger, whereas a two-spring construction will not do so.

Furthermore, the dimensions and material of the springs are selected with respect to the throw of the beam as determined by certain stop means, to the end that the springs have negligible stiffness for the small amount of deflection encountered. This is important to the sensitivity of the scale mechanism. I have found that if the springs are subjected to torsional deformation, their stiffness increases, thus reducing sensitivity and introducing inaccuracies into the weighing operation.

Other advantages of my invention are that the use of a beam which is supported on a knife edge type of fulcrum permits very fine control of the throw of the floating frame and spout so that there will be no interference or contact between the auger and the inner wall of the spout. According to this aspect of my invention I provide a connection between the floating frame and the beam which is in the form of two laterally spaced flexible members which cooperate with the four flexible frame supports to apply a vertical force to the beam in such a manner that the knife edge fulcrums are equally loaded. In other words, both the beam and the floating frame are free from torque.

Other objects, features and advantages will become apparent as the description proceeds.

With reference now to the drawings in which like reference numerals designate like parts:

FIG. 1 is a front elevation of a bag filling machine;

FIG. 2 is a vertical section taken along line 2—2 of FIG. 1;

FIG. 3 is a vertical section taken along line 3—3 of FIG. 2;

FIG. 4 is a plan section taken along line 4—4 of FIG. 2;

FIG. 5 is a detailed plan section taken along line 5—5 of FIG. 2; and

FIG. 6 is a detailed vertical section taken along line 6—6 of FIG. 3.

In FIGS. 1 and 2 the reference numeral 9 designates the framework of the machine which supports a hopper 10. The bag filling machine shown is of the auger type in which an auger 11 extends from the hopper 10 into the bag filling spout 12.

Disposed forwardly of the lower end of the hopper are two like frames, one being a stationary frame 13 and the other being the floating frame 14 on which the spout 12 is mounted. These frames are of an H-shape and each comprises vertical side bars and a connecting cross plate.

As shown in FIG. 2, the cross plate 15 of the stationary frame forms the front wall of the hopper 10, and is provided with a forwardly projecting collar 16. Similarly, the spout 12, which is mounted on the cross plate 17 of the floating frame 14 provides a rearwardly extending collar 18. A flexible rubber tube 19 fits over the collars 16 and 18 and forms a continuous passageway extending from the outlet 20 of the hopper 10 to and through the spout 12. The flexible tube 19 permits vertical movement of the floating frame 14 with respect to the stationary frame 13.

The floating frame 14 is connected at its four corners to the stationary frame 13 by a plurality of horizontally disposed leaf springs 21, which permit the aforesaid vertical movement which is of small extent. The leaf springs 21 are anchored at each end to the vertical bars 22 and 23 of the frames 13 and 14 respectively, by means of an underlying machined pad 24, and two screws 25 and washers 26. The parts are screwed down tightly and the use of two screws 25 at each end prevents skewing.

The vertical bars 22 of the stationary frame 13 support a fulcrum bar 27 having aligned knife edges 28. The mechanism includes a scale beam 29 having aligned notched bearing plates 30 (FIG. 6) which rest on the knife edges 28. The scale beam 29 comprises two legs, as shown in FIGS. 3 and 4, the fulcrum construction being duplicated for each leg.

The front end of each leg of the scale beam is provided with a machined pad 31. The vertical bars 23 of the floating frame 14 are each provided with a machined bracket 32 located below and aligned with the respective pads 31. The floating frame 14 is connected to the scale beam by two vertically disposed leaf springs 33 which serve as flexible force transmitting members, acting in tension. The leaf springs 33 are anchored at each end to the pads 31 and brackets 32, respectively, by two screws 34 and washers 35.

Thus, the weight of the bag contents is transmitted from the floating frame assembly 12–14 to the scale beam 29 through the flexible force transmitting members 33.

In operation, the cut-off point is determined by the setting of balance weight 36. As the weight of the material fed into the bag 43 approaches and then equals predetermined cut-off weight, the floating frame assembly will move downwardly, tilting the beam 29 in the counterclockwise direction as viewed in FIG. 2, to actuate a microswitch 37 connected to the auger motor 42 to stop the auger 11. Stops 38 and 39, located at the rear end of the scale beam 39, limit the throw of the scale beam, and hence of the floating frame assembly so that the auger 11 will always be maintained out of engagement with the inner wall of the spout 12. As shown in FIG. 2, a clearance 40 of between $\frac{1}{16}$ and $\frac{1}{8}$ of an inch is maintained between the auger periphery and the inner wall of the spout. The stops 38–39 are set to permit a total beam movement of substantially $\frac{5}{32}$ of an inch which, in view of a lever arm ratio of 3 to 1 or greater, represents a total throw of the floating frame assembly of somewhere between $\frac{1}{32}$ of an inch and $\frac{1}{16}$ of an inch. Thus, by the use of the beam arrangement shown herein, it is possible to limit the throw of the floating frame assembly to a fine degree, to the end that there will be no contact between the auger and the spout. The floating frame 14 will not overthrow the beam because the springs 33 are tension members.

According to the present arrangement, the upper leaf springs 21 are under tension, and the lower leaf springs 21 are under compression. The resistance to torsion is due partially to the fact that four springs are used which are offset to either side of the spout axis and partially to the fact that the upper and lower springs are spaced from each other by a substantial distance, such as 16½ inches in the arrangement shown, with the spout mounted in the upper half of the frame.

For instance, in FIG. 1 the vertical distance $d$ between the axis of the auger 11 and the upper springs 21 is less than 20% of the vertical distance between the upper and lower springs.

This spacing arrangement reduces the stress on the lower springs, which are the compression elements, with the result that they are very effective in resisting torque about the spout axis. In other words, the arrangement reduces the tendency of the lower springs to buckle under the vertical forces involved, in which buckled condition the torque resistance would be substantially diminished.

As a result of this construction, the sensitivity of the scale mechanism is not diminished due to stiffness developed in the upper springs 21 by torsional deformation. Thus, the four springs 21 provide a frictionless support for the floating frame 14. Since the throw of the beam is limited by the stops 38–39, the support springs 21 do not add any substantial resilience to the system which would introduce inaccuracy, or require damping.

In the preferred embodiment, the leaf springs 21 and 33 are formed of high carbon spring steel, blued and tempered, and are substantially .021 inch thick by 2 inches wide by 4 inches long, the effective length between supports being substantially 2½ inches in each instance.

Similarly, it has been found that the springs 33 serve solely as flexible connecting members since the stiffness and resilience contributed is negligible.

The flexible support arrangement permits a considerable simplification of structure as compared with the spacer point arrangement of my earlier patent for the reason that only four vertical bars, 22, 23 are required as contrasted with eight vertical elements of my prior arrangement. Thus problems of alignment and parallelism are reduced.

Furthermore, the four vertical bars 22, 23 are like elements. Each bar is provided with a machined vertical groove 41, the cross plates 15, 17, the knife edges 28, and the brackets 32 having machined side surfaces and being seated within the grooves with a tight fit and secured with screws. Thus, the two knife edges 28 are maintained in alignment with each other, and the spring engaging surfaces of the brackets 33 are aligned in a common vertical plane. The pads 24 and pad and bracket combination 31–32 enable the springs 21 and 33 to be maintained in a coplanar unstressed disposition to provide the negligible stiffness, undamped flexible connection which is the equivalent of the desired frictionless support for the floating frame, and the desired frictionless force transmitting member between the floating frame and the scale beam.

The present invention is also of utility where torque is imparted to the floating frame by means other than an auger type of feed; for instance, when the floating frame assembly includes a long hanger for a bag saddle, or a settler device as disclosed in my Patent No. 3,115,905, a certain torque or torsional vibration may be set up in some instances.

Although I have shown and described only a preferred embodiment of my invention, it will be understood that various modifications and changes may be made in the construction shown without departing from the spirit of my invention as pointed out in the appended claims.

I claim:

1. In an auger type bag filling machine having an auger, a motor for driving said auger, and switch means controlling the operation of said motor, scale mechanism comprising a stationary frame having knife edges secured thereto, a scale beam mounted on said knife edges for rocking movement, said switch being located adjacent to said scale beam and actuated by movement thereof, a vertically movable frame spaced forwardly of said stationary frame, a spout carried by said vertically movable frame, four leaf springs connecting said vertical movable frame to said stationary frame, each leaf spring being mounted at a corner of said vertically movable frame and being disposed in a horizontal plane to permit vertical movement of said vertically movable frame, and a pair of laterally spaced leaf springs disposed in a common vertical plane and connecting said vertically movable frame to said scale beam.

2. Scale mechanism as claimed in claim 1 in which said spout is located in the upper half of said floating frame.

3. Scale mechanism as claimed in claim 1 in which the vertical distance between the axis of said spout and the upper of said springs is substantially one-fifth of the vertical distance between the upper of said springs and the lower of said springs.

4. In a bag filling machine having a hopper, a bag supporting spout located forwardly of said hopper, an auger located within said hopper and extending into said spout, a motor driving said auger, switch means controlling the operation of said motor, and scale mechanism responsive to the weight of a bag and contents suspended from said spout for actuating said switch means, said scale mechanism comprising a stationary frame supported by said hopper and including a first pair of transversely spaced vertical bars, a floating frame spaced forwardly of said stationary frame and including a second pair of transversely spaced vertical bars, all of said vertical bars being of identical length, aligned knife edges mounted at the lower part of said first pair of vertical bars, a scale beam mounted on said knife edges, said bag supporting spout being mounted on said floating frame with the upper ends of said second pair of vertical bars extending above the elevation of said spout and the lower ends thereof extending below said elevation, torque resistant means supporting said floating frame from said stationary frame, said supporting means comprising a leaf spring connecting each upper and lower end of each vertical bar of said second pair with the corresponding end of each vertical bar of said first pair, each leaf spring being disposed in a horizontal plane to permit vertical movement of said floating frame, a pair of vertically disposed leaf springs connecting said floating frame with said scale beam at a point forwardly of said knife edges so that the vertical movement of said floating frame will cause rotation of said beam, and stop means located rearwardly of said knife edges and engaging said beam to maintain said horizontal leaf springs in a normal coplanar unstressed position.

5. A bag filling machine comprising a hopper having an outlet at its lower end, a bag supporting spout located forwardly of said hopper in alignment with said outlet, a flexible tube connecting said spout and said outlet, an auger located within said hopper and extending through said outlet and flexible tube into said spout, a motor driving said auger, a microswitch controlling the operation of said motor, the periphery of said auger being spaced from the inner wall of said auger to provide a clearance permitting vertical movement of said spout, a stationary frame supported by said hopper and including a first pair of transversely spaced vertical bars, a floating frame spaced forwardly of said stationary frame and including a second pair of transversely spaced vertical bars, all of said vertical bars being of identical length, aligned knife edges mounted at the lower part of said first pair of vertical bars, a scale beam mounted on said knife edges, said microswitch being located adjacent to said scale beam and actuated by movement thereof, said bag supporting spout being mounted on said floating frame with the upper ends of said second pair of vertical bars extending above the elevation of said spout and the lower ends thereof extending below said elevation, means supporting said floating frame from said stationary frame to resist the torque imparted thereto by the rotation of said auger within said spout, said supporting means comprising a leaf spring connecting each upper and lower end of each vertical bar of said second pair with the corresponding end of each vertical bar of said first pair, each leaf spring being disposed in a horizontal plane to permit vertical movement of said floating frame, flexible force transmitting means connecting said floating frame with said scale beam at a point forwardly of said knife edges so that the vertical movement of said floating frame will cause rotation of said beam, and stop means located rearwardly of said knife edges and engaging said beam to maintain said leaf springs in a normal coplanar unstressed position.

References Cited by the Examiner

UNITED STATES PATENTS

| | | | |
|---|---|---|---|
| 2,720,377 | 6/1951 | Kerler | 249—17 |
| 3,062,308 | 11/1962 | Anderson | 177—229 X |
| 3,196,966 | 7/1965 | Kennedy | 177—139 |

RICHARD B. WILKINSON, *Primary Examiner.*

G. H. MILLER, *Assistant Examiner.*